United States Patent
Abdi et al.

(10) Patent No.: US 11,055,460 B1
(45) Date of Patent: Jul. 6, 2021

(54) INPUT-DIRECTED CONSTRAINED RANDOM SIMULATION

(71) Applicant: Cadence Design Systems, Inc., San Jose, CA (US)

(72) Inventors: Ali Abdi, Haifa (IL); Guy Eliezer Wolfovitz, Haifa (IL)

(73) Assignee: CADENCE DESIGN SYSTEMS, INC., San Jose, CA (US)

( * ) Notice: Subject to any disclaimer, the term of this patent is extended or adjusted under 35 U.S.C. 154(b) by 0 days.

(21) Appl. No.: 16/880,311

(22) Filed: May 21, 2020

(51) Int. Cl.
| | |
|---|---|
| G06F 30/30 | (2020.01) |
| G06F 30/3323 | (2020.01) |
| G06F 30/3308 | (2020.01) |
| G06F 30/33 | (2020.01) |
| G06F 111/04 | (2020.01) |
| G06F 111/08 | (2020.01) |
| G06F 119/16 | (2020.01) |

(52) U.S. Cl.
CPC .......... *G06F 30/3323* (2020.01); *G06F 30/33* (2020.01); *G06F 30/3308* (2020.01); *G06F 2111/04* (2020.01); *G06F 2111/08* (2020.01); *G06F 2119/16* (2020.01)

(58) Field of Classification Search
None
See application file for complete search history.

(56) References Cited

U.S. PATENT DOCUMENTS

| | | | | |
|---|---|---|---|---|
| 7,130,783 | B1 * | 10/2006 | Harer | G06F 30/33 703/13 |
| 7,865,339 | B2 * | 1/2011 | Rushby | G06F 11/3684 703/2 |
| 10,007,746 | B1 | 6/2018 | Wolfovitz | |
| 10,762,262 | B1 * | 9/2020 | Moon | G06F 30/33 |

OTHER PUBLICATIONS

X. Wang et al., "Hybrid SAT Solver Considering Circuit Observability," The 9th International Conference for Young Computer Scientists, 2008 IEEE Computer Society, pp. 65-70. (Year: 2008).*
H.-H. Yeh et al., "Automatic Constraint Generation for Guided Random Simulation," 2010 IEEE, pp. 613-618, (Year: 2010).*
R. Dutra et al., "Efficient Sampling of SAT Solutions for Testing," 2018 ACM/IEEE 40th Int'l Conference on Software Engineering, ACM ISCE May 27-Jun. 3, pp. 549-559. (Year: 2018).*
R. Dutra et al., "GuidedSampler: Coverage-guided Sampling of SMT Solutions," 2019 Formal Methods in Computer Aided Design (FMCAD), Oct. 22-25, San Jose, CA, pp. 203-211. (Year: 2019).*

* cited by examiner

*Primary Examiner* — Leigh M Garbowski
(74) *Attorney, Agent, or Firm* — Tarolli, Sundheim, Covell & Tummino LLP (57) ABSTRACT

A system and method for input-directed constrained random simulation includes obtaining an initial state for a finite state machine (FSM) that models an electronic circuit design under test (DUT), the initial state assigning values to registers of the device under test, by providing an initial state function I(s) relating to the FSM to a satisfiability problem (SAT) solver to obtain register values that satisfy the initial state function. A random Boolean circuit R(i) is constructed.

(Continued)

A SAT solver is queried for a satisfying assignment for a conjoined expression providing the conjunction of at least a valid-transition Boolean circuit T(s, i, s') and the random Boolean circuit R(i), the valid-transition Boolean circuit describing valid transitions of the FSM as a function of current state s, inputs i, and next state s'. The satisfying assignment is added to the end of a constructed trace.

20 Claims, 10 Drawing Sheets

INPUT-DIRECTED CONSTRAINED RANDOM SIMULATION

TECHNICAL FIELD

The present invention relates generally to electronic design automation (EDA) tools and techniques for circuit design verification, and specifically to a method and system for input-directed constrained random simulation.

BACKGROUND

EDA uses software tools for design and analysis of complex digital electronic systems such as printed circuit boards (PCBs) and integrated circuits (ICs). So as to ensure correct operability of a complicated digital electronic circuit design before significant investment is committed in the physical fabrication of chips or boards that use the design, and thus to avoid substantial waste and retooling, prior to fabrication of the design, a design can be required to pass a series of verification tests collectively referred to as "signoff."

Pre-production design verification is thus a part of the digital semiconductor development cycle devoted to determining that a digital circuit design behaves as intended and within design specifications. Often performed prior to layout and routing phases of the development cycle, register transfer level (RTL) simulation and verification of a digital semiconductor design ensures that the design is logically correct and without major timing errors. In doing verification for a digital circuit design, a simulation setup can consist of two parts, a design under test (DUT) and a testbench (TB). In the context of pre-production verification, a DUT is a software description of a hardware device intended to be fabricated, written using a specification language such as Specification and Description Language (SDL), for example, Verilog, VHDL, or SystemVerilog. By contrast, a testbench is a software description at least of inputs to be applied to the DUT during suites of simulation test runs. A testbench is generally also configured to capture outputs of the DUT to which it is connected. Simulated outputs can be compared to expected outputs to provide the desired verification.

Dynamic verification (also known as "experimental verification" or "test verification") tests the DUT by providing inputs to the DUT (typically via a testbench) and checking outputs from the DUT. Formal verification, by contrast, analyzes the DUT to determine its correctness. Methods for automatic formal verification include language containment and model checking.

Constrained random verification can involve choosing a suitable hardware verification language (HVL), defining a testbench architecture, and producing constraints to be used for generating proper (legal) random stimuli. When the testbench is used in simulating a DUT, a random seed value and a simulator may be used as part of the verification environment. The seed may help in reproducing a failure (bug) if the other inputs (e.g., the testbench architecture-components hierarchy and the set of constraints used) remain constant. Any change to these inputs may lead to different results despite using the same seed value. The random seed value and the constraints may be fed or provided to a constraint solver, which can be integrated as part of the simulator, to generate random values.

SUMMARY

One example includes a method for input-directed constrained random simulation. The method includes obtaining an initial state for a finite state machine (FSM) that models an electronic circuit DUT, the initial state assigning values to registers of the device under test, by providing an initial state function I(s) relating to the FSM to a satisfiability problem (SAT) solver to obtain register values that satisfy the initial state function. The method further includes constructing a random Boolean circuit R(i) and querying the SAT solver or a different SAT solver for a satisfying assignment for a conjoined expression providing the conjunction of at least a valid-transition Boolean circuit T(s, i, s') and the random Boolean circuit R(i), the valid-transition Boolean circuit describing valid transitions of the FSM as a function of current state s, inputs i, and next state s'. The method further includes adding the satisfying assignment to the end of a constructed trace.

Another example includes a system for input-directed constrained random simulation including a processor and a memory. The processor is configured to obtain an initial state for an FSM that models an electronic circuit DUT, the initial state assigning values to registers of the device under test, by providing, to a SAT solver, an initial state function I(s) relating to the FSM, to obtain register values that satisfy the initial state function. The processor is further configured to query the SAT solver or a different SAT solver for a satisfying assignment for a conjoined expression providing the conjunction of at least a valid-transition Boolean circuit T(s, i, s') and a random Boolean circuit R(i), the valid-transition Boolean circuit describing valid transitions of the FSM as a function of current state s, inputs i, and next state s'. The processor is further configured to add the satisfying assignment to the end of a constructed trace.

Yet another example includes one or more computer-readable media configured to provide a computer as the system set forth above, or to execute in conjunction with a computer the method set forth above. Such an example can include one or more non-transitory computer-readable media storing instructions that, when executed by a processor, cause the processor to obtain an initial state for an FSM that models an electronic circuit DUT to obtain register values that satisfy an initial state function I(s). The processor is then caused to construct a random Boolean circuit R(i) and to query a SAT solver for a satisfying assignment for a conjoined expression providing the conjunction of at least a valid-transition Boolean circuit T(s, i, s') and the random Boolean circuit R(i), the valid-transition Boolean circuit describing valid transitions of the FSM as a function of current state s, inputs i, and next state s'. The satisfying assignment is then added to the end of a constructed trace.

DETAILED DESCRIPTION

The present invention relates to a method and system for an input-directed constrained random simulation of a DUT of an electronic circuit, e.g., an integrated circuit to be fabricated on a chip. The systems and methods described herein provide an input-directed constrained random simulator that is likely to exercise traces with diverse input values in a constrained environment. The constrained random simulator uses input-directed randomization to guide the constrained random simulation solution to find traces with diverse (random) input values.

Figure 1:
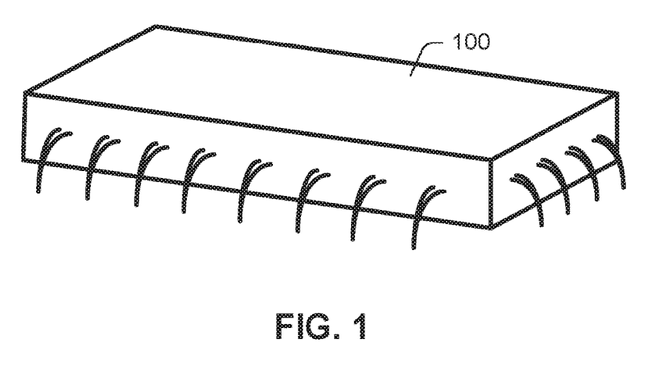
FIG. 1 depicts an example electronic chip, which may be the final result in a process of designing and producing an electronic circuit involving applying a system or method for input-directed constrained random simulation.
Figure 2:
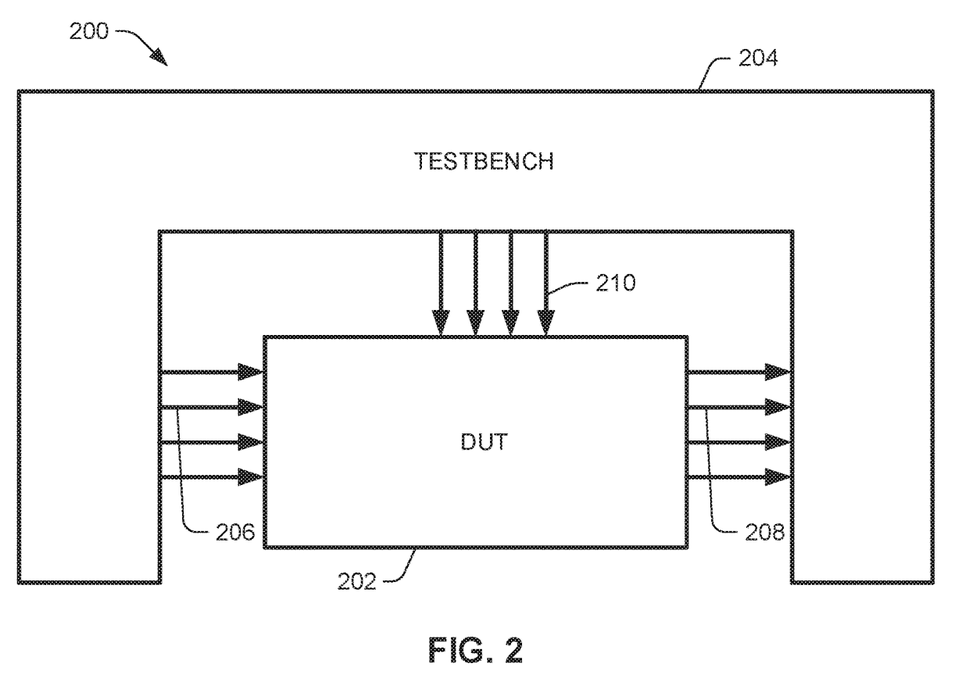
FIG. 2 schematically illustrates an example system for simulating a DUT that includes a simulated DUT and a testbench, which may be part of a process of designing and producing an electronic circuit involving applying a system or method for input-directed constrained random simulation.

EDA tools (e.g., formal verification tools) may transform a model (e.g., in Verilog) of a DUT into a finite state machine (FSM) representation. A FSM is a mathematical model used in designing sequential logic circuits to model a design of an electronic circuit (e.g., an electronic chip having a package and various conductive terminals, such as the chip 100 depicted in FIG. 1, which may be the final result in a process of designing and producing an electronic circuit that involves applying a system or method for input-directed constrained random simulation). FIG. 2 schematically illustrates an example system 200 for simulating a DUT 202, which may be used in a process of designing and producing an electronic circuit, which involves applying a system or method for input-directed constrained random simulation. System 200 can include a simulated DUT 202 (a simulation model of a planned design for an electronic circuit, e.g., chip) and a simulation testbench 204. Simulated test stimuli may be provided via inputs 206 by the testbench 204 to DUT 202, and simulation outputs from the DUT 202 may be passed via outputs 208 to the testbench 204. Controls 210 may also be used in a dynamic verification setup.

At every step of the simulation, constrained random simulation extends a maintained simulation trace by one cycle. This is done by solving a constraint satisfaction problem defined in the current state s, the next state s', and the inputs i. Solving is done using a solution engine for a Boolean satisfiability problem, commonly known in the art as a SAT solver. In general, a SAT solver can be a deterministic SAT solver or a randomized SAT solver. Randomization is added to this simulation trace extension step by instructing the chosen SAT solver to select independently for every underlying variable (or for some of the underlying variables, e.g., specifically those associated with the inputs) a random value, whenever possible.

Figure 3:
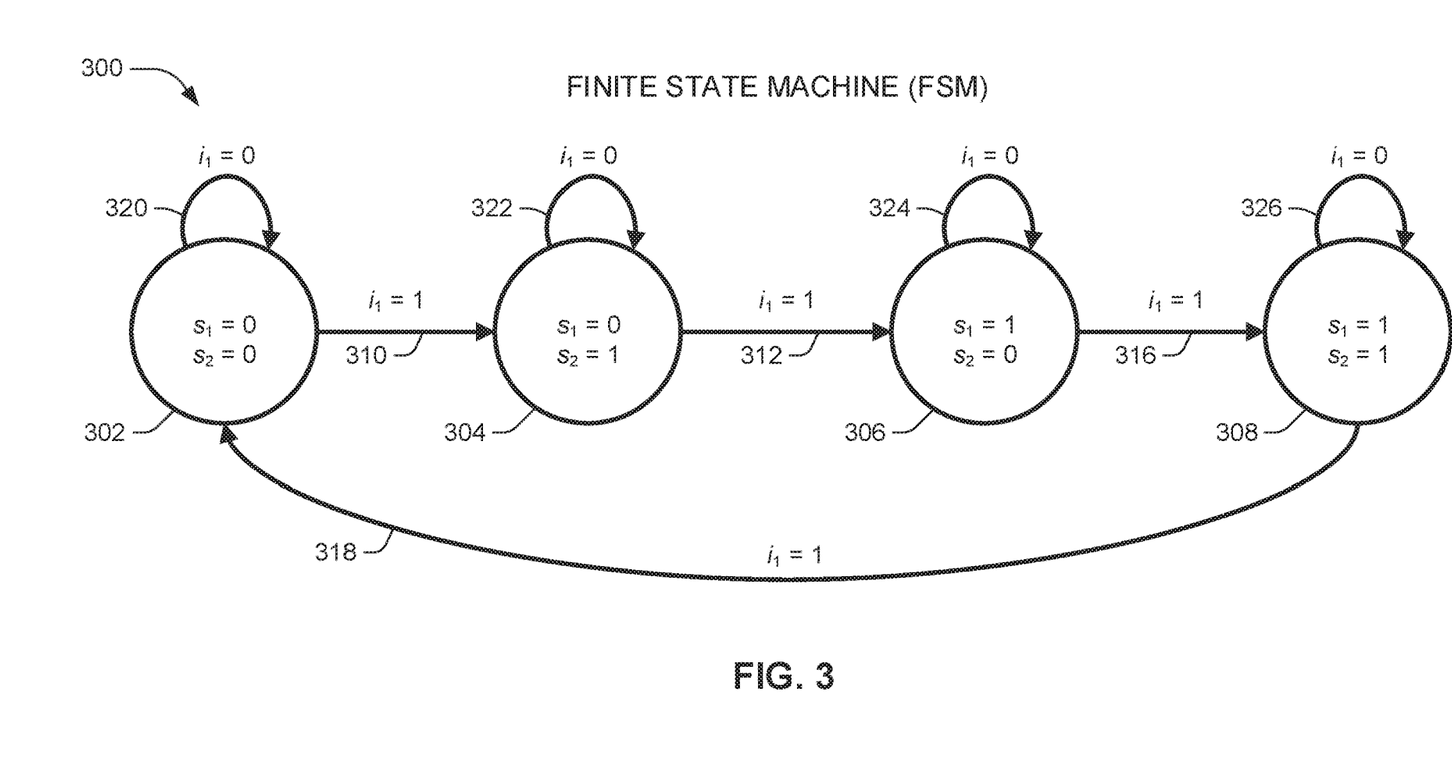
FIG. 3 depicts an example FSM of a counter, which may relate to a system or method for input-directed constrained random simulation.

Constrained random simulation works on an FSM that describes the behavior of a system, such as a digital circuit. An FSM consists of (1) a set of vertices, each describing a state of the system; (2) a set of directed edges connecting pairs of vertices, each directed edge being labeled with a different input value, and describing legal transitions in the system from one state to another state given an input value; and (3) a set of one or more vertices designated as initial state(s), describing the state(s) from which the system starts. FIG. 3 illustrates an example FSM 300 for a simple counter on two bits. Accordingly, the example FSM 300 has two state variables, $s_1$ and $s_2$, representing the two bits of the counter, and one input variable, $i_1$, indicating whether or not the counter counts up by one bit ($i_1=1$) or does not ($i_1=0$). The values of these state variables are given for each of the four illustrated states 302, 304, 306, 308. Directed edges 310, 312, 316, 318 define lawful interstate transitions. Edges 320, 322, 324, 326 each maintain the FSM 300 in a respective same previous state.

An output of the simulation generated by a simulation system (e.g., simulation system 200 of FIG. 2) is a trace, an alternating sequence of state variable values and input values that describe a path in the simulated FSM (e.g., FSM 300 of FIG. 3) starting at an initial state (defined by a vertex) and proceeding among various states (vertices) of the FSM along the transitions (directed edges connecting vertices). Such a trace can be rendered graphically or can be described in a written notation. An example of such a trace, as defined for the counter 300 counting upward from binary zero to binary one by making a transition along edge 310 from initial state 302 to second state 304 but then remaining there at second state 304 (binary one) for several cycles of inputs by following looping edge 320 four consecutive times, is $\{s_1=0\ s_2=0\}\ \{i_1=1\}\ \{s_1=0\ s_2=1\}\{i_1=0\}\ \{s_1=0\ s_2=1\}\ \{i_1=0\}$ $\{s_1=0\ s_2=1\}\ \{i_1=0\}\ \{s_1=0\ s_2=1\}\{i_1=0\}\ \{s_1=0\ s_2=1\}$. The generated trace can be analyzed to find examples of behavior of the simulated FSM (e.g., the Verilog implementation) not adhering to the specification, permitting a circuit design to be corrected prior to fabrication. To achieve a useful simulation that adequately simulates the DUT, a requirement of the simulation is that the trace generated be random. The immediately preceding trace is an example of one that is not particularly random: it chooses $i_1=0$ more than 50% of the time, resulting in the trace getting "stuck" at state 304.

Although the example of FIG. 3 presents, for simplicity of illustration, an FSM with only four states and only two state variables, an FSM can describe a system with many states and many state variables—hundreds, thousands, perhaps millions. The number of vertices of the FSM, corresponding to the number of the states that the system represented by the FSM may be in, is exponential in the number of state variables. Consequently, in practice, the FSM is described symbolically, using Boolean formulas. Such formulas can describe the set of initial states, and the set of valid transitions in the system. For example, the initial states can be described by a Boolean formula I defined on the state variables $s=\{s_1, s_2, s_3, \ldots, s_n\}$ as $$I(s) = I(s_1, s_2, s_3, \ldots, s_n) = \begin{cases} 1, & \text{if } s \text{ is an initial state} \\ 0, & \text{otherwise} \end{cases}$$

For example, $I(s_0, s_1)\ !s_0\ \&\ !\ s_1$ is the symbolic formula describing the set of initial states of the example FSM 300 of FIG. 3.

The valid transitions can be described by a Boolean formula T defined on the state variables $s=s_1, s_2, \ldots, s_n$, on the set of input variables $i=\{i_1, i_2, \ldots, i_m\}$, and the next state variables $s'=s_1', s_2', \ldots, s_n'$.

$$T(s, i, s') = I(s_1, s_2, s_3, \ldots, s_n, i_1, i_2, \ldots, i_m, s_1', s_2', \ldots, s_n') = \\ \begin{cases} 1, & \text{if there is a transition from } s \text{ to } s' \text{ given } i \\ 0, & \text{otherwise} \end{cases}$$

For example, $T(0, 1, 0, 0, 1)=1$ for the example FSM 300 of FIG. 3, because given input $i_1=0$, there is a transition from state $\{s_1=0\ s_2=1\}$ to itself. In another example, $T(0, 1, 1, 0, 1)=0$ for the example FSM 300 of FIG. 3, because given input $i_1=1$, there is no transition from state $\{s_1=0\ s_2=1\}$ to itself. In yet other examples, $T(0, 0, 1, 1, 0)=0$ and $T(0, 0, 0, 1, 0)=0$ for the example FSM 300 of FIG. 3, because given input $i_1=1$ or $i_1=0$, there is no transition from state $\{s_1=0\ s_2=0\}$ to state $\{s_1=1\ s_2=0\}$ (note in FIG. 3 that there is no edge connecting vertices 302 and 306). In still another example, $T(0, 1, 0, 1, 0)=0$ for the example FSM 300 of FIG. 3, because given input $i_1=0$, there is no transition from state $\{s_1=0\ s_2=1\}$ to state $\{s_1=1\ s_2=0\}$ (note in FIG. 3 that while there is an edge 312 connecting vertices 304 and 306, this edge 312 requires an input $i_1=1$, which is not satisfied by $i_1=0$).

Figure 4:
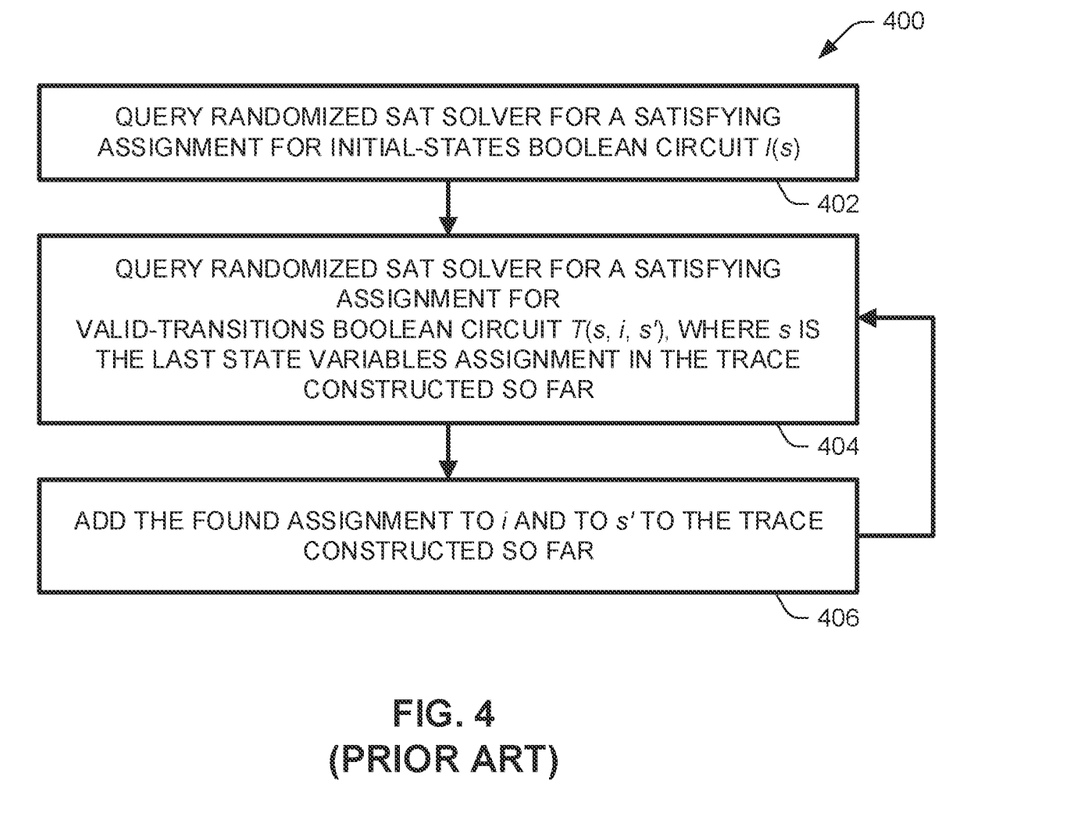
FIG. 4 is a flow diagram of an example method of constrained random simulation.

FIG. 4 illustrates a method 400 implementing constrained random simulation. Given Boolean circuits I and T describing respectively the initial states of a system and its valid transitions, the simulation uses a randomized SAT solver to create a random trace. A SAT solver is any program, generally implemented in software, but which can also be implemented in hardware using, for example, an application-specific integrated circuit (ASIC), that receives as input a Boolean formula f, and outputs either some assignment x such that $f(x)=1$ if one such x exists, and otherwise outputs "unsatisfiable" to indicate that there is no assignment x such that $f(x)=1$. An assignment x such that $f(x)=1$ is called a satisfying assignment for f. A randomized SAT solver is a SAT solver that includes an internal pseudo-random number generator, seeded by some initial value, and produces a random satisfying assignment (if one exists) according to some internal unknown distribution to bias the search for a satisfying assignment so that multiple calls to the SAT solver ideally produce a new satisfying assignment every time.

A constrained random simulation can create a random trace as follows. The method 400 begins by querying 402 a randomized SAT solver for a satisfying assignment for an initial-states Boolean circuit I(s). Following this query 402, the trace produced by the simulation consists of a single element, which is an assignment to the state variables. Thus, at this point, s represents the last state variables assignment in the trace constructed so far. Then, method 400 proceeds by querying 404 a randomized SAT solver for a satisfying assignment for valid-transitions Boolean circuit T(s, i, s'). Presuming a satisfying assignment is found by the SAT solver, at this point in method 400, the method has found an assignment to i and s' such that $T(s, i, s')=1$. Next, method 400 adds 406 the found assignment to i and to s' to the end of the trace constructed so far. The trace has thus been built up by one additional trace-element, and at this point in method 400, the trace constructed so far ends with the assignment to i, followed by the assignment for s'.

As shown in FIG. 4, method 400 proceeds iteratively in a loop between SAT-solver query 404 and adding-to-trace 406 until some termination condition is met, such as a timeout, a user termination executed by a user issuing an instruction via an interface, or the method 400 having reached a threshold number of iterating steps in the 404/406 loop or having arrived at a threshold number of different states in the generated trace, which in either case may be defined in some examples by one or more user-configurable preset variables, or in other examples by one or more adaptively derived variables adjusted by some simulation success criterion. For example, a user or adaptive system may instruct the simulation system to repeat the loop so as to generate a trace with one hundred states. In still other examples, a system can be configured to repeat this loop until any loop-termination condition is met and then also to further repeat method 400 a number of times, e.g., 20 times, each time with the SAT solver being initialized with a new seed value such that each generated trace produces a differently biased "exploration" of the FSM and/or begins a trace from a different initial state from among the legal initial states.

At any point in the iterative loop after SAT solver query 404, rather than the SAT solver returning a satisfying assignment, the SAT solver query may return "unsatisfiable," in which case the search may backtrack (effectively undoing the last loop iteration and removing the last element of the trace, and then performing the loop iteration over again to obtain a new next state that does not result in getting stuck upon the next loop iteration, i.e., that does not result in a SAT solver query 404 that returns "unsatisfiable") or restart (by going back to the beginning 402 of the method 400 and selecting a different initial state than that originally chosen at the beginning of method 400).

In constrained random simulation, variable assignments (e.g., for s, i, s') are generally not pre-stored in a table or database. This is because there may be hundreds, thousands, or conceivably even millions of state variables, and even one hundred state variables results in an FSM having $2^{100}$ possible combinations of state variable assignments. Such a large number of variable assignments is, in practice, too large to store in any computer memory. Accordingly, these state variables may be generated randomly, as by a pseudo-random number generator.

Constraints are formal and unambiguous specifications of design behaviors and aspects. In the context of constrained random simulation, constraints define what input combinations can be applied and when. There are basically two types of constraints in constrained random simulation: the environment constraints and constraints used as test directives. The former define the interface protocol, which must be strictly followed. The latter are used on top of the environment constraints to steer the simulation to the desired test scenarios, the so-called "corner cases." In other words, constrained random simulation is meaningful only if the test stimuli meet certain requirements of the environment, and can become more interesting with the help of additional test directives.

Constrained random simulation may randomize the inputs along a simulation trace by using randomization knobs provided by the underlying SAT solver. Thus, a key problem with constrained random simulation is that the randomization of input values along a simulation trace completely depends on the underlying implementation of the SAT solver. Consequently, it is hard to give any general guarantees regarding the distribution of input values in the simulation trace. As a result, the solution is not robust: it may behave extremely differently when replacing the underlying SAT solver, or under two different but similar environments, or even under two identical environments that have different encodings.

Thus, a main drawback of the above-described method 400 to constrained random simulation, as illustrated in FIG. 4, is that it has weak randomization guarantees, with regards to whether an appropriately random trace is generated. The distribution of the trace completely depends on how randomization is implemented inside the SAT solver (if it is at all implemented). The distribution induced by the SAT solver may be unknown to the larger simulation system, or may be very hard to analyze, and could potentially be very weak.

For example, in FSM 300 of FIG. 3, when a randomized SAT solver is queried for a satisfying assignment for T(0, 0, $i_1$, $s_1'$, $s_2'$), it would be desirable for the solver to return, 50% of the times queried, a satisfying assignment with $i_1$=0, and 50% of the times a satisfying assignment with $i_1$=1. However, such a result distribution is generally not guaranteed, and it may be that some SAT solver implementations return 100% of the times a satisfying assignment with $i_1$=1. The result is that the constrained "random" simulation is not truly random, and, thus, the design being tested may not be adequately and thoroughly checked for potential problems that may need to be corrected prior to proceeding with the design and fabrication process.

The systems and methods described herein can provide, for example, a formal verification engine that implements input-directed constrained random simulation. The above-described problem with constrained random simulation is addressed by the systems and methods described herein by employing input-directed randomization to guide the constrained random simulation solution to find traces with diverse (random) input values. Instead of randomizing the inputs along a simulation trace by using, for example, randomization knobs provided by an underlying SAT solver, input-directed constrained random simulation randomizes the values of the inputs by efficiently "coloring" the set of all possible input values at every given cycle (without using a SAT solver), choosing a "color" at random (without using a SAT solver), and only then using a SAT solver to find, deterministically, an input "colored" by the selected "color." Input-directed constrained random simulation allows the generation of simulation traces, the input values of which do not depend on the underlying SAT solver technology, and which exercise diverse, random values in a robust manner.

Input-directed constrained random simulation thereby provides the advantage of better randomization of input values along simulation traces, as compared to constrained random simulation that does not use input-directed randomization. In particular, this implies a better state space traversal and/or better coverage of the constrained random simulator. Input-directed constrained random simulation further provides the advantage of better control over input values distribution, as compared to constrained random simulation that does not use input-directed randomization. The distribution of inputs is no longer the unknown distribution imposed by a specific SAT solver implementation. In particular, this implies a constrained random simulator that is robust against design changes.

In essence, input-directed constrained random simulation lifts the burden of randomization from the SAT solver to the larger simulation method. The SAT solver used in the new proposal can be deterministic, as opposed to randomized. Input-directed constrained random simulation systems and methods improve the guarantees on the distribution of satisfying assignments, as compared to a constrained random simulation system implementing a method like method 400 shown in FIG. 4. In principle, input-directed constrained random simulation can be used to implement the uniform distribution.

Input-directed constrained random simulation systems and methods of the type described herein make use of a "random circuit." A random circuit is a Boolean formula chosen from some prescribed distribution over Boolean formulas. The construction of such random circuits enables input-directed constrained random simulation systems and methods to lift the randomization from the SAT solver to the simulation method itself. Moreover, use of input-directed constrained random simulation systems and methods enables actual control over the distribution of the satisfying assignments returned by the SAT solver. That is, any distribution can be set from which a random circuit used in the input-directed method is chosen.

In input-directed constrained random simulation systems and methods, a randomized SAT solver is not called upon to find a satisfying assignment to the valid-transitions Boolean formula T(s, i, s'). Instead, a deterministic (or randomized) SAT solver is queried to find a satisfying assignment to the conjunctive Boolean formula T(s, i, s')$\wedge$R(i), where R(i) is a random circuit over the input variables. The symbol $\wedge$ represents logical conjunction, i.e., the logical "AND" function.

Figure 5:
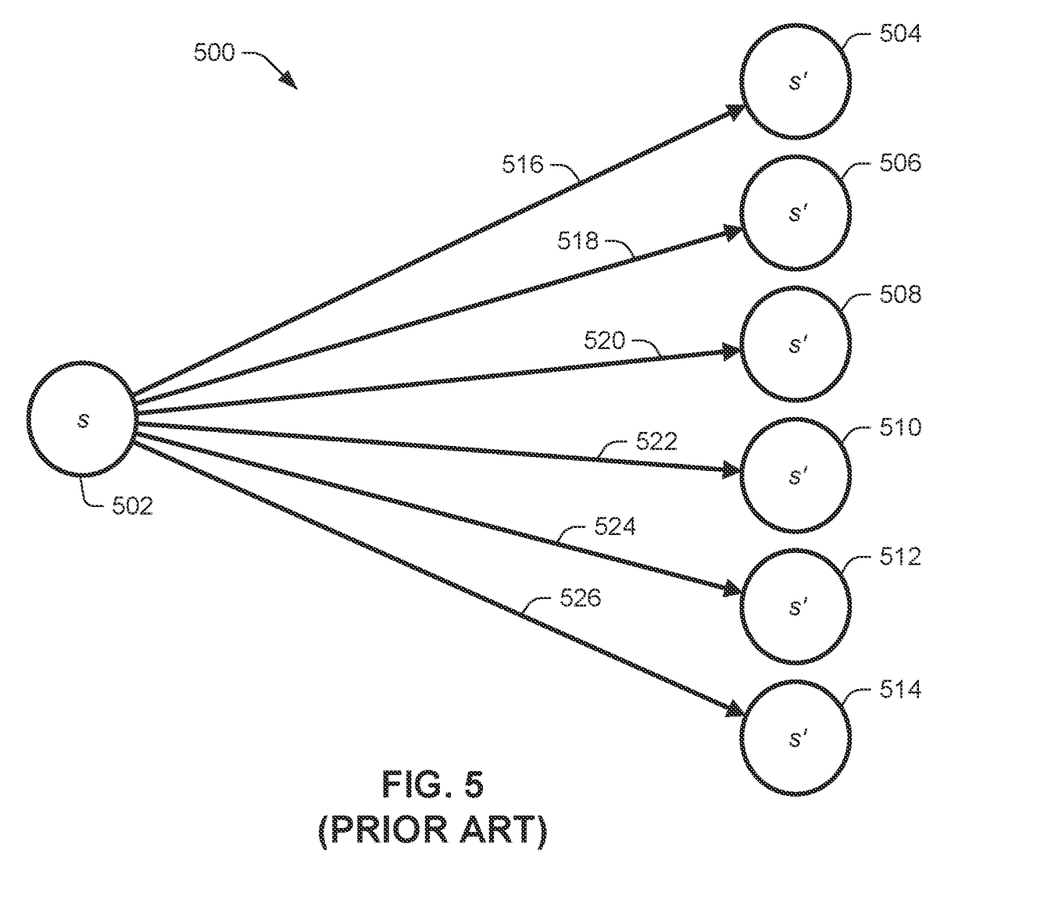
FIG. 5 illustrates an excerpt of an example FSM showing possible transitions from one state to other states.

FIG. 5 pictorially illustrates a SAT solver query 500 for a satisfying assignment to the valid-transitions Boolean formula T(s, i, s'). A SAT solver can be queried to select one outgoing edge (from among edges 516, 518, 520, 522, 524, and 526) out of the vertex 502 corresponding to current state s leading to potential next-states s', i.e., into vertices 504, 506, 508, 510, 512, and 514. When adding the conjunct R(i) to the SAT solver query, input-directed constrained random simulation in effect restricts, from outside of the SAT solver, the set of outgoing transitions that the SAT solver may select a satisfying assignment from; moreover, input-directed constrained random simulation restricts that set randomly.

Figure 6:
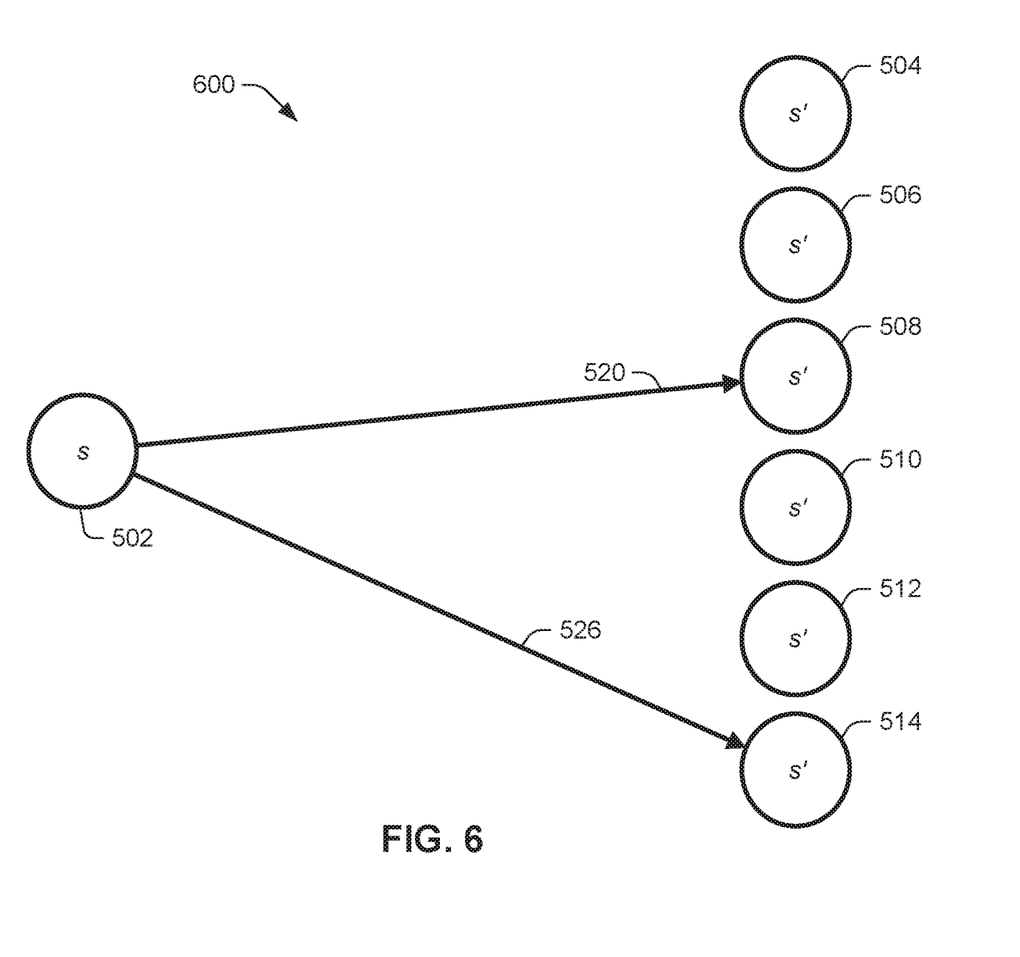
FIGS. 6-8 each illustrate an excerpt of the example FSM of FIG. 5 showing possible transitions from one state to other states, the set of transitions being restricted in each drawing in different random ways by different instances of a random circuit.
Figure 7:
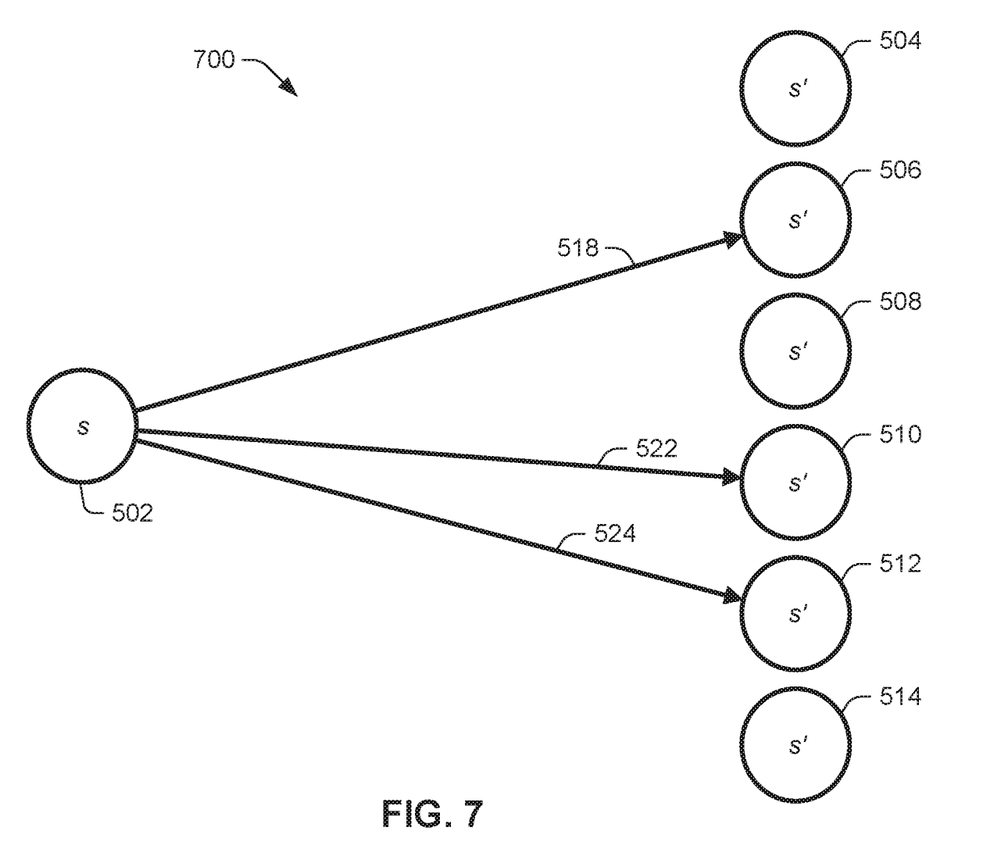
Figure 8:
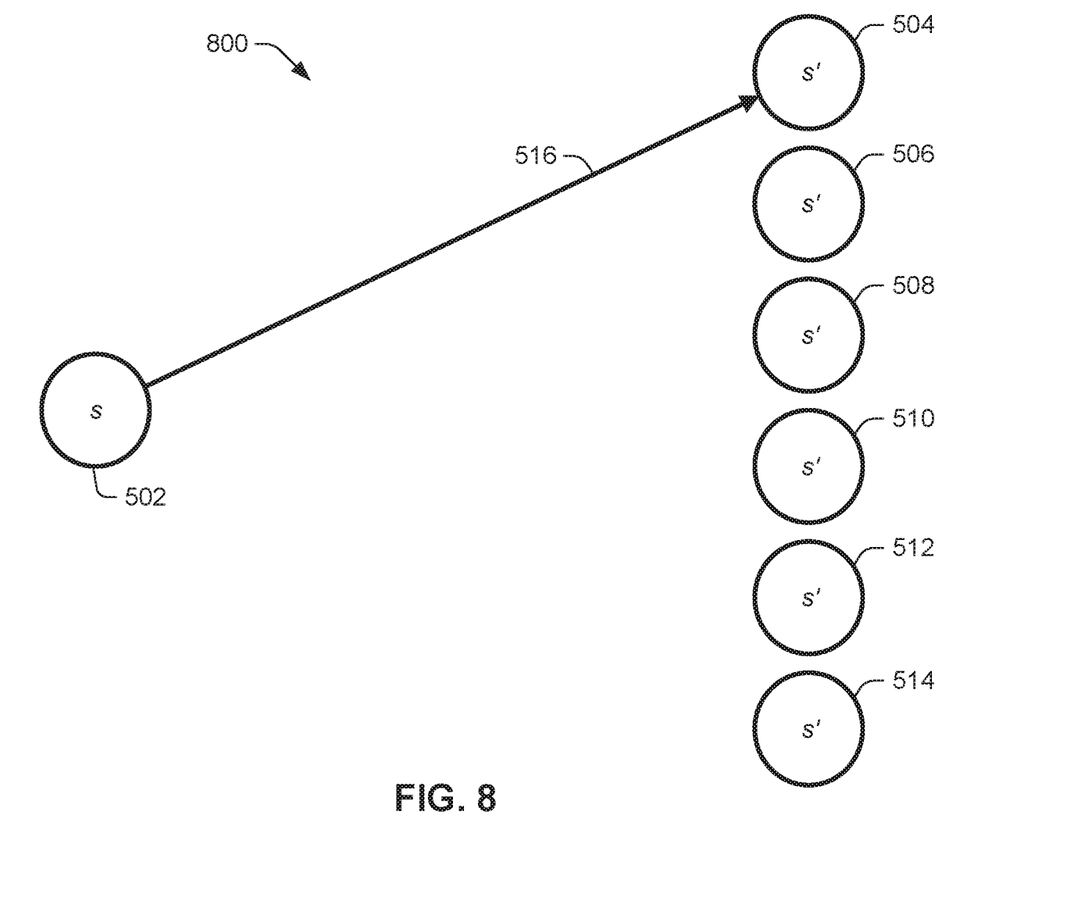

FIGS. 6, 7, and 8 illustrate example such randomly restricted sets, and thus show how different instances of the random circuit R(i) can restrict the set of outgoing transitions from s and the satisfying assignment to the conjunction T(s, i, s')$\wedge$R i in a different random way. In example query 600 of FIG. 6, illustrating the conjunction T(s, i, s')$\wedge$R(i) for a first example instance of random circuit R(i), the set of transitions has been randomly limited to the transition 520 between state 502 and state 508, and the transition 526 between state 502 and state 514. In example query 700 of FIG. 7, illustrating the conjunction T(s, i, s')$\wedge$R(i) for a second example instance of random circuit R(i), the set of transitions has been randomly limited to the transition 518 between state 502 and state 506, the transition 522 between state 502 and state 510, and the transition 524 between state 502 and state 512. In example query 800 of FIG. 8, illustrating the conjunction T(s, i, s')$\wedge$R(i) for a third example instance of random circuit R(i), the set of transitions has been randomly limited to just one transition: the transition 516 between state 502 and state 504.

With reference to FIG. 5, in which all transitions between current state s and potential next-states s' are available for the SAT solver to pick from, it may be noted that a SAT solver, even a randomized one, may always pick the same outgoing edge whenever queried for a SAT assignment for T(s, i, s'). This is not possible, however, with the conjunction of random circuit R(i), as illustrated in FIGS. 6-8, where the set of transitions for the SAT solver to pick from has been randomly limited according to a distribution that is (a) wholly external to the SAT solver, (b) adjustable, and (c) analyzable for any suspected problems with its randomness.

Figure 9:
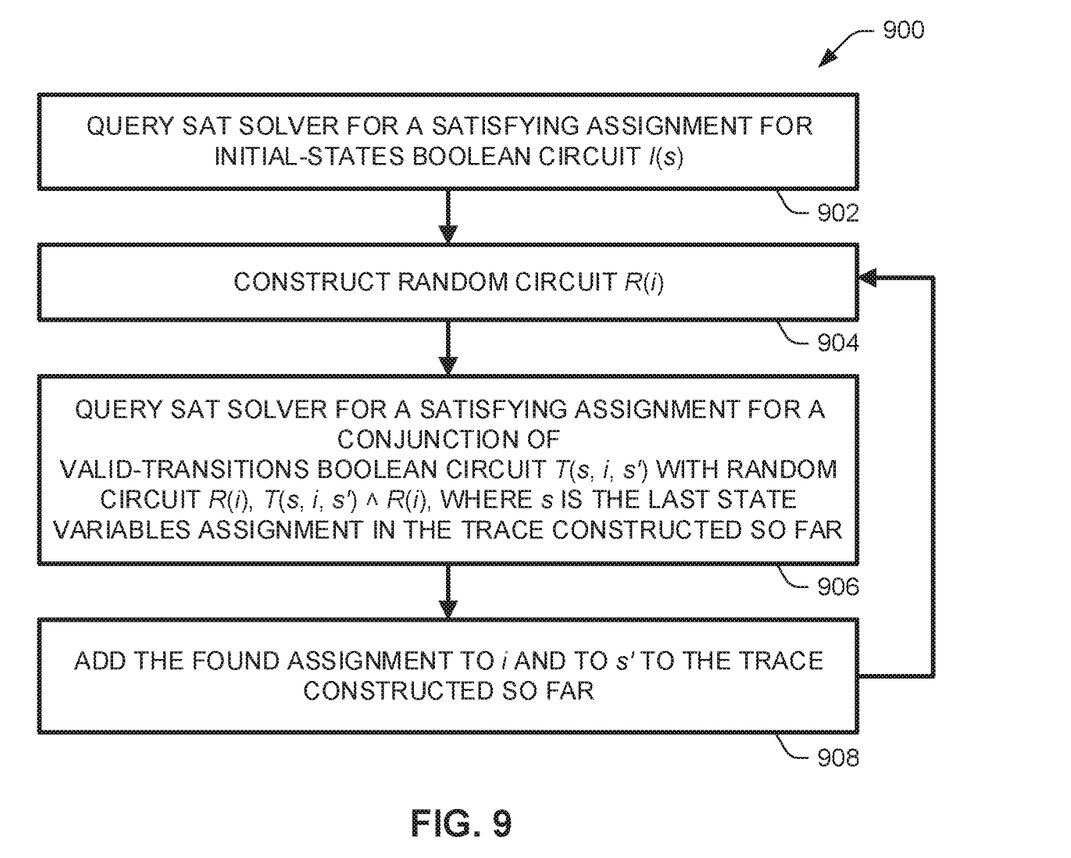
FIGS. 9-10 are a flow diagrams of example methods of input-directed constrained random simulation.

FIG. 9 illustrates an example method 900 of input-directed constrained random simulation. Given Boolean circuits I and T describing respectively the initial states of a system and its valid transitions, the simulation uses a SAT solver to create a random trace as follows. A SAT solver is queried 902 for a satisfying assignment for initial-states Boolean circuit I(s). In contrast to method 400 of FIG. 4, the SAT solver queried in input-directed method 900 of FIG. 9 need not be a randomized SAT solver; it can be a deterministic SAT solver or a randomized SAT solver. Following this first query 902, the trace produced by the simulation consists of a single element, which is an assignment to the state variables. A random circuit R(i) is then constructed 904. At this point, s represents the last state variables assignment in the trace constructed so far. A SAT solver is queried 906 for a satisfying assignment for the conjunctive formula T(s, i, s')∧R(i) (conjoining the valid-transitions Boolean circuit with the random circuit earlier constructed 904). Again, the SAT solver queried 906 need not be a randomized SAT solver. Presuming a satisfying assignment is found by the SAT solver, at this point in method 900, the method has found an assignment to i and s' such that T(s, i, s')=1. Next, method 900 adds 908 the found assignment to i and to s' to the end of the trace constructed so far. The trace has thus been built up by one additional trace-element, and at this point in method 900, the trace constructed so far ends with the assignment to i, followed by the assignment for s'.

As shown in FIG. 9, method 900 proceeds iteratively in a loop between random-circuit construction 904, SAT-solver query 906, and adding-to-trace 908 until some termination condition is met, such as a timeout, a user termination executed by a user issuing an instruction via an interface, or the method 900 having reached a threshold number of iterating steps in the 904/906/908 loop, which may be defined in some examples by a user-configurable preset variable, or in other examples by an adaptively derived variable adjusted by some simulation success criterion. For example, a user or adaptive system may instruct the simulation system to repeat the loop so as to generate a trace with one hundred states. In still other examples, a system can be configured to repeat this loop until any loop-termination condition is met and then also to further repeat method 900 a number of times.

At any point in the iterative loop after SAT solver query 906, rather than the SAT solver returning a satisfying assignment, the SAT solver query may return "unsatisfiable," in which case the search may backtrack or restart, as discussed above with respect to method 400.

Random circuit R(i) is generated as a real random circuit over the inputs i, and can be generated in a variety of ways. An example random circuit R(i) might be generated using a random set of inputs with a random set of polarities applied to each input, combined according to random logical AND and OR functions:

$$R(i)=R(i_1,i_2,i_3,\ldots,i_n)=(i_1\&!i_2\&!i_4\&i_5)\|(i_3\&i_7\&!i_8)$$

This method of random circuit generation, however, may generate random circuits whose distribution of satisfying assignments is far from uniform. An improved way of generating a random circuit R(i) is as a logical AND of a set of random circuits $R_j(i)$:

$$R(i)=R(i_1,i_2,i_3,\ldots,i_n)=\mathrm{AND}(R_1(i),R_2(i),\ldots,R_k(i)),$$

where each of the component random circuits $R_j(i)$ is generated as:

$$R_j(i)=\mathrm{XOR}(b_1\&i_1,b_2\&i_2,\ldots,b_n\&i_n,b_{n+1}),$$

where $b_1, b_2, \ldots, b_n+1$ are chosen each uniformly at random from {0, 1}, freshly for every circuit $R_j(i)$. This way of generating random circuits R(i) generates random circuits R(i) having the desirable property that the set of satisfying assignments provided by the SAT solver will be approximately uniformly random subsets of state variables, whatever the input variables are.

Figure 10:
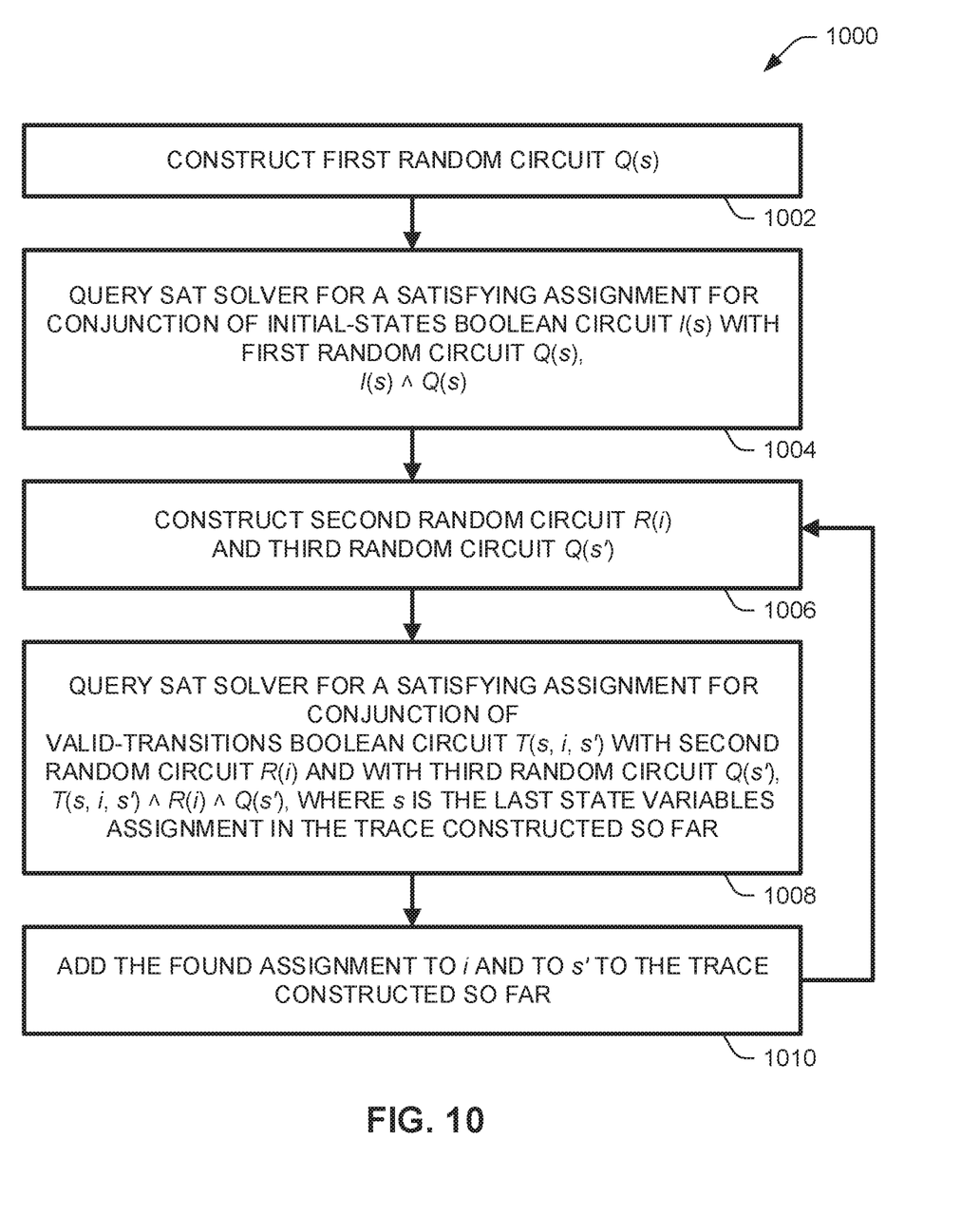

FIG. 10 illustrates an example method 1000 of input-directed and next-state directed constrained random simulation that extends the method 900 of input-directed random simulation of FIG. 9 by constructing random circuits to randomize the next state. Given Boolean circuits I and T describing respectively the initial states of a system and its valid transitions, the simulation uses a SAT solver to create a random trace as follows. A first random circuit Q(s), representative of a set of current-states, is constructed 1002. A SAT solver is queried 1004 for a satisfying assignment for the conjunctive formula I(s)∧Q(s) (conjoining the initial-states Boolean circuit with the first random circuit earlier constructed 1002). The SAT solver queried 1004 need not be a randomized SAT solver; it can be a deterministic SAT solver or a randomized SAT solver. Following this first query 1004, the trace produced by the simulation consists of a single element, which is an assignment to the state variables. Second and third random circuits R(i) and Q(s') are then constructed 1006. Second random circuit R(i) is representative of a set of input variables and third random circuit Q(s') is representative of a set of next-states. At this point, s represents the last state variables assignment in the trace constructed so far. A SAT solver is then queried 1008 for a satisfying assignment for the conjunctive formula T(s, i, s')∧R(i)∧Q(s'). Again, the SAT solver queried 1008 need not be a randomized SAT solver. Presuming a satisfying assignment is found by the SAT solver, at this point in method 1000, the method has found an assignment to i and s' such that T(s, i, s')=1. Next, method 1000 adds 1010 the found assignment to i and to s' to the end of the trace constructed so far. The trace has thus been built up by one additional trace-element, and at this point in method 1000, the trace constructed so far ends with the assignment to i, followed by the assignment for s'.

As shown in FIG. 10, method 1000 proceeds iteratively in a loop between second- and third-random-circuit construction 1006, SAT-solver query 1008, and adding-to-trace 1010 until some termination condition is met, such as a timeout, a user termination executed by a user issuing an instruction via an interface, or the method 1000 having reached a threshold number of iterating steps in the 1006/1008/1010 loop, which may be defined in some examples by a user-configurable preset variable, or in other examples by an adaptively derived variable adjusted by some simulation success criterion. For example, a user or adaptive system may instruct the simulation system to repeat the loop so as to generate a trace with one hundred states. In still other examples, a system can be configured to repeat this loop until any loop-termination condition is met and then also to further repeat method 1000 a number of times.

At any point in the iterative loop after SAT solver query 1008, rather than the SAT solver returning a satisfying assignment, the SAT solver query may return "unsatisfiable," in which case the search may backtrack or restart, as discussed above with respect to method 400.

Figure 11:
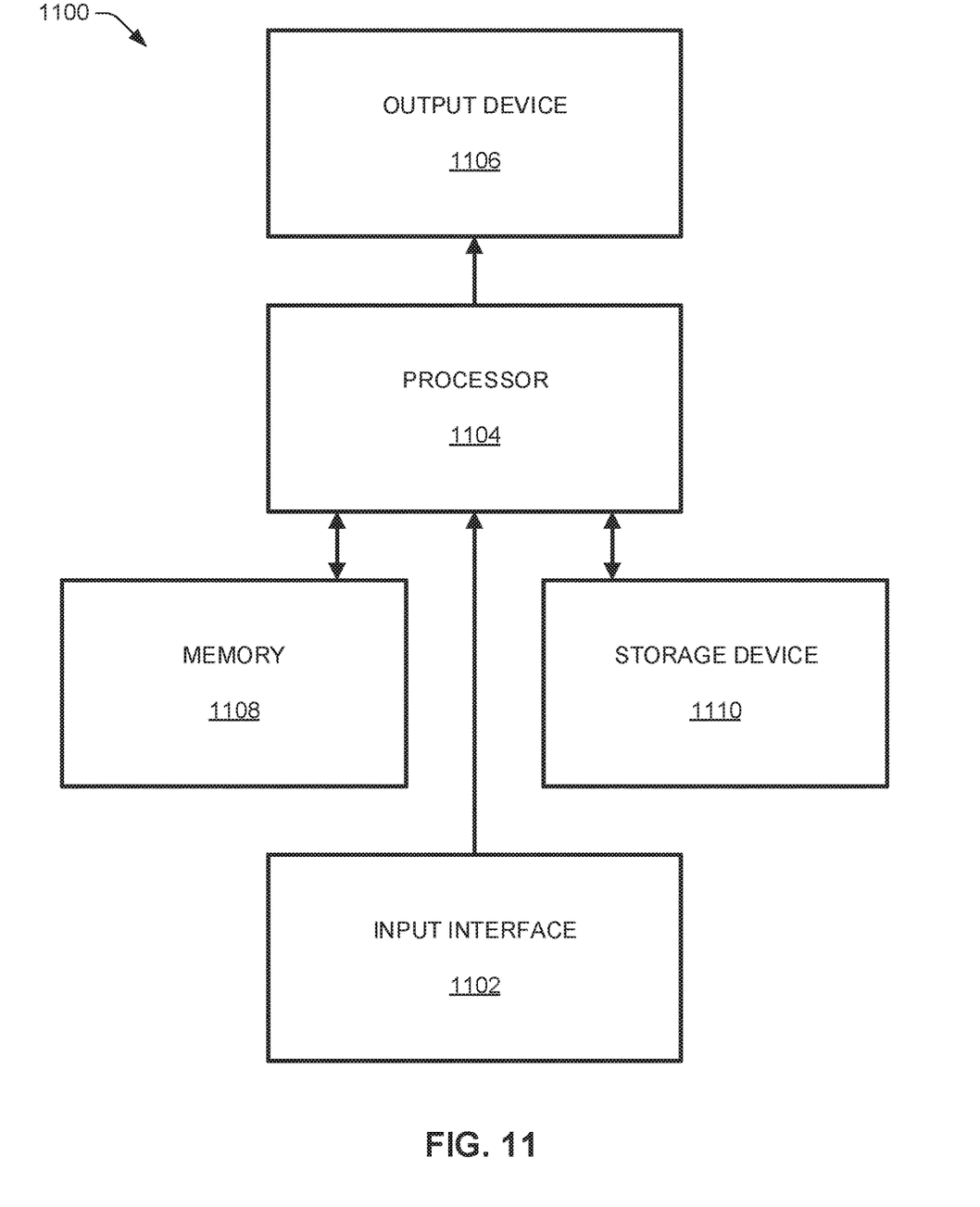
FIG. 11 is a block diagram illustrating an example system for input-directed constrained random simulation.

FIG. 11 illustrates an example system 1100 for input-directed constrained random simulation. System 1100 may include a processor 1104 (e.g., a single processor or a processing unit that includes a plurality of processors, on a single machine or distributed on a plurality of machines) for executing a method of input-directed constrained random simulation. Processor 1104 may be configured, for example, to perform one of methods 900 or 1000 according to program instructions.

Processor 1104 may be linked with memory 1108 on which a program implementing a method of input-directed constrained random simulation and corresponding data may be loaded and run from, and storage device 1110, which can include a non-transitory computer-readable medium (or media) such as, for example, one or a plurality of hard disks, flash memory devices, etc., on which a program implementing a method of input-directed constrained random simulation and corresponding data may be stored. System 1100 may further include an output device 1106 (e.g. display device such as a CRT, LCD, LED, etc.) on which one or a plurality user interfaces associated with a program implementing a method of input-directed constrained random simulation and corresponding data may be presented. System 1100 may also include input interface 1102, such as, for example, one or a plurality of keyboards, pointing devices, touch sensitive surfaces (e.g. touch sensitive screens), etc. for allowing a user to input commands and data.

Some examples of the present invention may be embodied in the form of a system, a method, or a computer program product. Similarly, some examples may be embodied as hardware, software, or a combination of both. Some examples may be embodied as a computer program product saved on one or more non-transitory computer-readable medium (or media) in the form of computer-readable program code embodied thereon. Such non-transitory computer readable medium may include instructions that when executed cause a processor to execute method steps in accordance with examples described herein, such as are shown in FIGS. 9 and 10. In some examples, the instructions stored on the computer-readable medium may be in the form of an installed application and in the form of an installation package. Such instructions may be, for example, loaded by one or more processors, such as processor 1104, and executed.

For example, the computer readable medium may be a non-transitory computer-readable storage medium. A non-transitory computer-readable storage medium may be, for example, an electronic, optical, magnetic, electromagnetic, infrared, or semiconductor system, apparatus, or device, or any combination thereof.

Computer program code may be written in any suitable programming language. The program code may execute on a single computer system, or on a plurality of computer systems.

What have been described above are examples of the invention. It is, of course, not possible to describe every conceivable combination of components or methodologies for purposes of describing the invention, but one of ordinary skill in the art will recognize that many further combinations and permutations of the invention are possible. Accordingly, the invention is intended to embrace all such alterations, modifications, and variations that fall within the scope of this application, including the appended claims. Additionally, where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. A method for input-directed constrained random simulation, the method comprising:
    obtaining an initial state for a finite state machine (FSM) that models an electronic circuit design under test (DUT), the initial state assigning values to registers of the DUT, by providing, to a satisfiability problem (SAT) solver, an initial state function I(s) relating to the FSM, to obtain register values that satisfy the initial state function;
    constructing a random Boolean circuit R(i);
    querying the SAT solver or a different SAT solver for a satisfying assignment for a conjoined expression providing a conjunction of at least a valid-transition Boolean circuit T(s, i, s') and the random Boolean circuit R(i), the valid-transition Boolean circuit describing valid transitions of the FSM as a function of current state s, inputs i, and next state s'; and
    adding the satisfying assignment to the end of a constructed trace.

2. The method of claim 1, further comprising repeating the constructing the random Boolean circuit, the querying the SAT solver or the different SAT solver for the satisfying assignment for the conjoined expression, and the adding the satisfying assignment to the end of a constructed trace in an iterative loop to construct the trace such that it includes a plurality of states and inputs.

3. The method of claim 2, further comprising terminating the iterative loop upon a timeout.

4. The method of claim 2, further comprising terminating the iterative loop based upon the loop having performed a user-configured or adaptively derived number of iterations.

5. The method of claim 2, further comprising terminating the iterative loop based upon the constructed trace including a user-configured or adaptively derived number of different states.

6. The method of claim 1, wherein the random Boolean circuit R(i) is a second random Boolean circuit;
    the method further comprising constructing a first random Boolean circuit Q(s);
    wherein the obtaining the initial state for the FSM comprises querying the SAT solver for a satisfying assignment of an expression conjoining the initial state function I(s) and the first random Boolean circuit Q(s);
    the method further comprising constructing a third random Boolean circuit Q(s'); and
    wherein the conjoined expression provides the conjunction of at least the valid-transition Boolean circuit T(s, i, s'), the second random Boolean circuit R(i), and the third random Boolean circuit Q(s').

7. The method of claim 6, further comprising repeating the constructing the second random Boolean circuit R(i) and the third random Boolean circuit Q(s'), the querying the SAT solver or the different SAT solver for the satisfying assignment for the conjoined expression, and the adding the satisfying assignment to the end of a constructed trace in an iterative loop to construct the trace such that it includes a plurality of states and inputs.

8. A system for input-directed constrained random simulation comprising a processor and a memory, wherein the processor is configured to:
    obtain an initial state for a finite state machine (FSM) that models an electronic circuit design under test (DUT), the initial state assigning values to registers of the DUT, by providing, to a satisfiability problem (SAT) solver, an initial state function I(s) relating to the FSM, to obtain register values that satisfy the initial state function;
    query the SAT solver or a different SAT solver for a satisfying assignment for a conjoined expression providing a conjunction of at least a valid-transition Boolean circuit T(s, i, s') and a random Boolean circuit R(i), the valid-transition Boolean circuit describing valid transitions of the FSM as a function of current state s, inputs i, and next state s'; and
    add the satisfying assignment to the end of a constructed trace.

9. The system of claim 8, wherein the processor is further configured to repeat the constructing the random Boolean circuit, the querying the SAT solver or the different SAT solver for the satisfying assignment for the conjoined expression, and the adding the satisfying assignment to the end of a constructed trace in an iterative loop to construct the trace such that it includes a plurality of states and inputs.

10. The system of claim 9, wherein the processor is further configured to terminate the iterative loop upon a timeout.

11. The system of claim 9, wherein the processor is further configured to terminate the iterative loop based upon the loop having performed a user-configured or adaptively derived number of iterations.

12. The system of claim 9, wherein the processor is further configured to terminate the iterative loop based upon the constructed trace including a user-configured or adaptively derived number of different states.

13. The system of claim 8, wherein
the random Boolean circuit R(i) is a second random Boolean circuit;
the processor is further configured to construct a first random Boolean circuit Q(s);
the obtaining the initial state for the FSM comprises querying the SAT solver or the different SAT solver for a satisfying assignment of an expression conjoining the initial state function I(s) and the first random Boolean circuit Q(s);
the processor is further configured to construct a third random Boolean circuit Q(s'); and
wherein the conjoined expression provides the conjunction of at least the valid-transition Boolean circuit T(s, i, s'), the second random Boolean circuit R(i), and the third random Boolean circuit Q(s').

14. The system of claim 13, wherein the processor is further configured to repeat the constructing the second random Boolean circuit R(i) and the third random Boolean circuit Q(s'), the querying the SAT solver or the different SAT solver for the satisfying assignment for the conjoined expression, and the adding the satisfying assignment to the end of a constructed trace in an iterative loop to construct the trace such that it includes a plurality of states and inputs.

15. A non-transitory computer-readable medium storing instructions that, when executed by a processor, cause the processor to:
obtain an initial state for a finite state machine (FSM) that models an electronic circuit design under test (DUT) to obtain register values that satisfy an initial state function I(s);
construct a random Boolean circuit R(i);
query a SAT solver for a satisfying assignment for a conjoined expression providing a conjunction of at least a valid-transition Boolean circuit T(s, i, s') and the random Boolean circuit R(i), the valid-transition Boolean circuit describing valid transitions of the FSM as a function of current state s, inputs i, and next state s'; and
add the satisfying assignment to the end of a constructed trace.

16. The computer-readable medium of claim 15, wherein the instructions further cause the processor to repeat the constructing the random Boolean circuit, the querying the SAT solver for the satisfying assignment for the conjoined expression, and the adding the satisfying assignment to the end of a constructed trace in an iterative loop to construct the trace such that it includes a plurality of states and inputs.

17. The computer-readable medium of claim 16, wherein the instructions further cause the processor to terminate the iterative loop upon a timeout or based upon the loop having performed a user-configured or adaptively derived number of iterations.

18. The computer-readable medium of claim 16, wherein the instructions further cause the processor to terminate the iterative loop based upon the constructed trace including a user-configured or adaptively derived number of different states.

19. The computer-readable medium of claim 15, wherein
the random Boolean circuit R(i) is a second random Boolean circuit;
the instructions further cause the processor to construct a first random Boolean circuit Q(s);
the obtaining the initial state for the FSM comprises querying the SAT solver for a satisfying assignment of an expression conjoining the initial state function I(s) and the first random Boolean circuit Q(s);
the instructions further cause the processor to construct a third random Boolean circuit Q(s'); and
wherein the conjoined expression provides the conjunction of at least the valid-transition Boolean circuit T(s, i, s'), the second random Boolean circuit R(i), and the third random Boolean circuit Q(s').

20. The computer-readable medium of claim 19, wherein the instructions further cause the processor to repeat the constructing the second random Boolean circuit R(i) and the third random Boolean circuit Q(s'), the querying the SAT solver for the satisfying assignment for the conjoined expression, and the adding the satisfying assignment to the end of a constructed trace in an iterative loop to construct the trace such that it includes a plurality of states and inputs.

* * * * *